United States Patent [19]

Martinez-Soto et al.

[11] Patent Number: 4,940,480
[45] Date of Patent: Jul. 10, 1990

[54] MOLDING COOLING SYSTEM FOR THE MANUFACTURE OF GLASS ARTICLES OR SIMILAR MATERIALS

[75] Inventors: Alfredo Martinez-Soto, Rincon Colonial; Jorge Loredo-Murphy, Monterrey; Benito Becerril-Ortega, Puesta Del Sol, all of Mexico

[73] Assignee: Vitro Tec Fideicomiso, Monterrey, Mexico

[21] Appl. No.: 302,820

[22] Filed: Jan. 26, 1989

Related U.S. Application Data

[63] Continuation-in-part of Ser. No. 110,173, Oct. 19, 1987, abandoned.

[51] Int. Cl.$^5$ .......................................... F28D 21/00; F28D 15/00; B29C 33/02
[52] U.S. Cl. ................................. 65/356; 65/374.11; 65/374.12; 165/104.17
[58] Field of Search ............ 65/162, 319, 265, 374.13, 65/355, 356, 374.11, 374.12; 165/104.17

[56] References Cited

U.S. PATENT DOCUMENTS

| | | | |
|---|---|---|---|
| 3,224,860 | 12/1965 | Stinnes | 65/355 |
| 3,258,324 | 6/1966 | Torok | 65/356 X |
| 4,446,916 | 5/1984 | Hayes | 165/104.17 X |

Primary Examiner—Kenneth M. Schor
Attorney, Agent, or Firm—Abelman Frayne Rezac & Schwab

[57] ABSTRACT

Disclosed is a glassware forming mold of three-layer construction including first and third bodies, one of which is to be in contact with a portion of molten glass fed, for controlling the heat transference in a glassware forming process. A second central body is located between said first and third bodies and is comprised of a metallic alloy which melts approximately at temperature between about 375° C. and 550° C. corresponding to a working temperature of the molten glass, provides a solid-liquid state, to control the heat transference from the molten glass to the first or third bodies and from these to the environment during the glass forming process, whereby the glass distribution within the mold is improved.

8 Claims, 4 Drawing Sheets

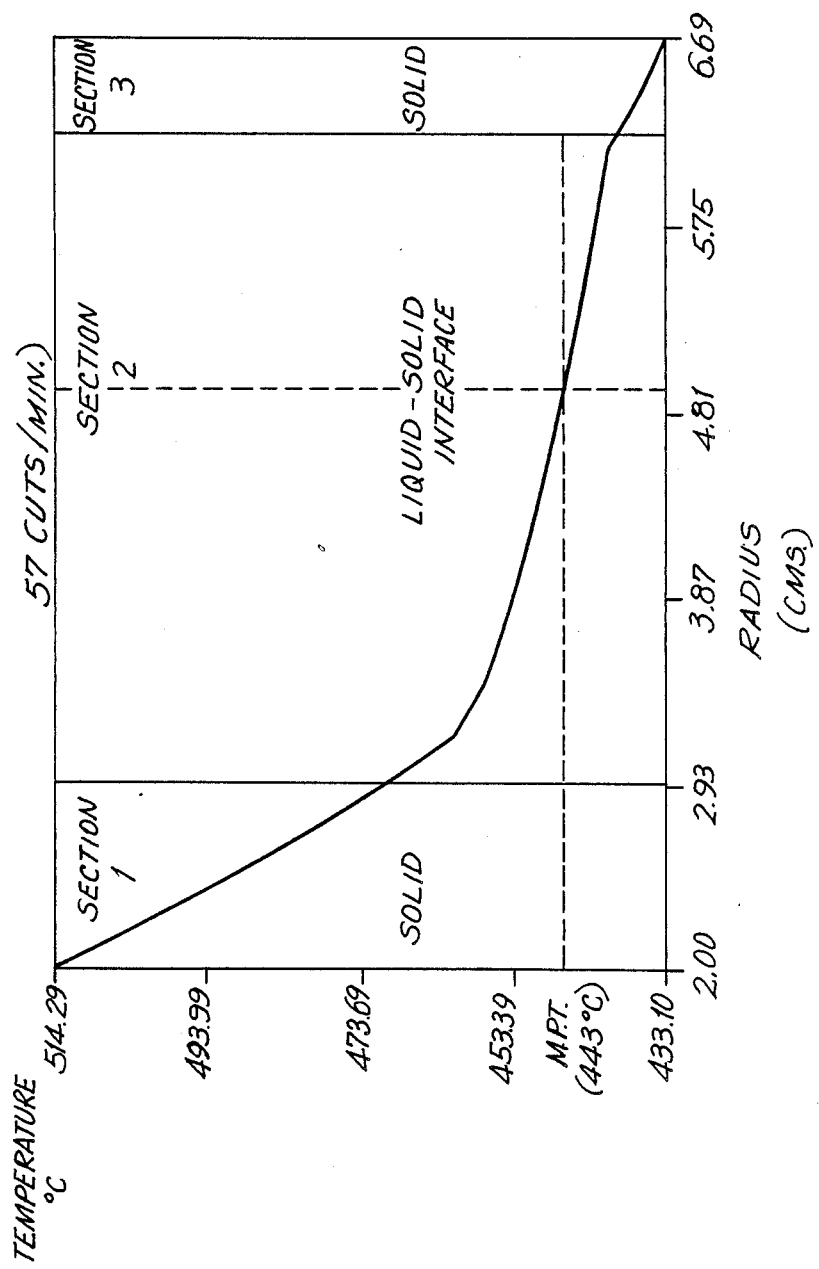

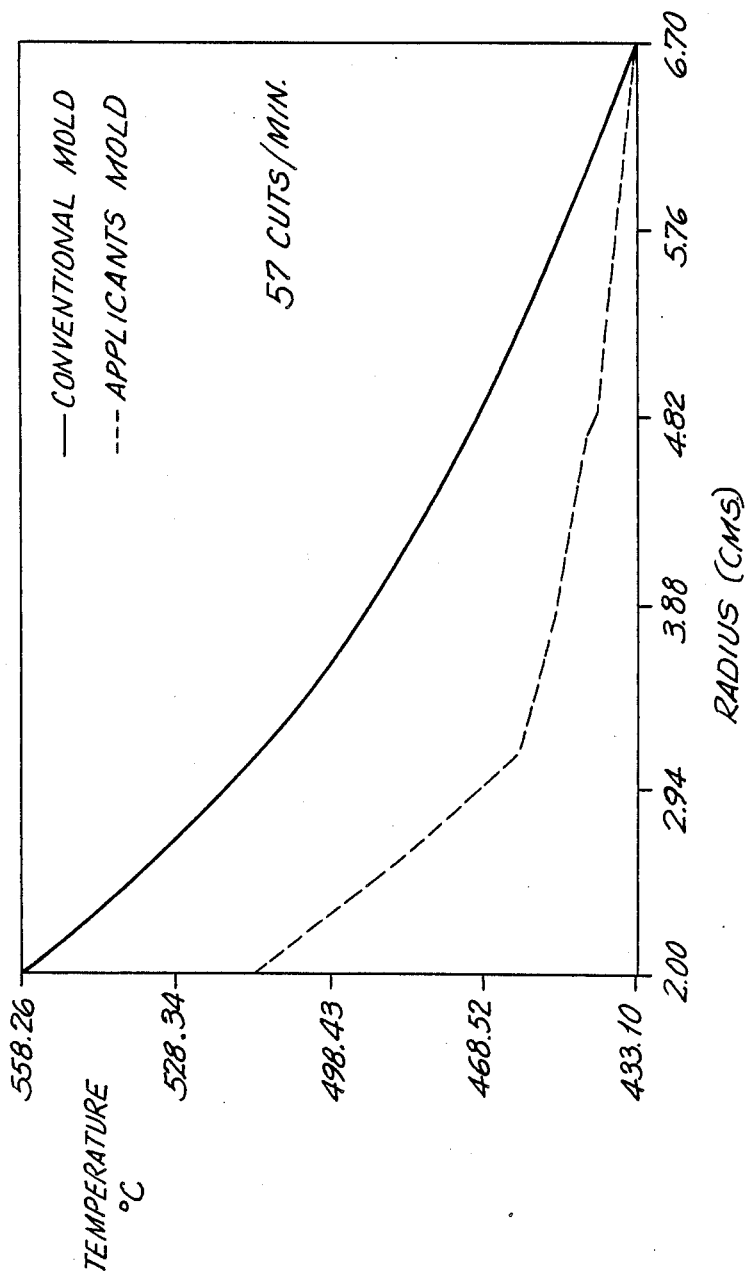

MOLDING COOLING SYSTEM FOR THE MANUFACTURE OF GLASS ARTICLES OR SIMILAR MATERIALS

This application is a continuation in part of application Ser. No. 110,173 filed Oct. 19, 1987 and now abandoned.

FIELD OF THE INVENTION

The present invention relates to a molding cooling system for the manufacture of glass articles or similar materials, and more particularly to a mold and plunger design to improve the uniformity and intensity of the heat transfer between the molten glass and mold during the glass forming process.

BACKGROUND OF THE INVENTION

The design of molding equipment for glass forming machines, were oriented mainly to increase the life of the molding equipment and to control and regulate the heat transfer.

However, due to the increase in the speed of operation of the glass forming machines, and to the limitations in mold thickness and air flow to cool the molds, the next advances were carried out on the development of new materials and new concepts to optimize the mold cooling.

Recently, the tendency to diminish the weight of the articles and maintaining or increasing their mechanical strength, had pushed to the glass industry to design the molds with an improved thermal control, in order to get a better glass distribution and additionally, as it will be possible, produce a surface free of flaws. For that, the technological strategies were focused on more sophisticated molds, which were not practical or economical in the past.

At the present time, the mold design must consider, the following:

That the glass mechanical strength is in a direct relation to its surface quality, as the fracture mechanic theories have established; and such surface quality is mainly configured by the mold;

That the glass thickness distribution depends strongly of the cavity mold temperature, which implies to provide an adequate cooling and mechanisms to get thermal stability; and, The design criteria used in the past, that is, machine speed, air cooling and space limitation, mold life, replacement and maintenance time, cost, etc.

When the suitable glass temperature range is lost, appear problems in the process, i.e. if the molds work too hot, the fault may be sticking of the glass at some part of the mold interfering with release of the ware thus resulting in checking and deforming the ware. If the mold works too cold, produce a chill wrinkled surface, which avoids a proper blown or pressed up fully to shape, or may be checked in the process of shaping.

One of the main problems of the previous art molds is that the heat transfer between the molten glass and the mold is not uniform. This causes uneven temperature distribution in the mold cavity, producing cracks or checks of thermal origin in some sections of the formed articles and/or an uneven distribution of the glass in the walls of the articles.

Another present situation of the art is that, due to the high speed of operation of the glass forming machines, the molds tend to work hotter.

In order to dissipate the heat, a great number of cooling systems are already known, for example, in U.S. Pat. No. 3,666,433 issued to H. H. Nebelung et al., a blank mold is provided with a thermocouple generally intermediate to the upper and lower ends of one mold half section, and with the temperature sensitive portion thereof as close as possible to the mold cavity itself. The mold is air cooled and a control system which includes a damper valve for controlling the flow of cooling air in response to the output of the thermocouple.

Some other cooling systems such as those described in U.S. Pat. Nos. 3,888,647 of Breeden et al., 4,361,434 of Schneider, 4,388,099 of Hermening et al., 4,502,879 of Foster, 4,525,191 of Fenton and 4,578,104 of Jones, also shown different arrangements for molds cooling, wherein the main cooling fluid is air.

However, one of the main problems of the molds that are cooled with air, is that in order to effect a better heat transfer, it is necessary to increase the heat transfer area or increase the flow of the cooling air. In last case, the increase in the air flow is limited by the excessive noise.

Another arrangements that have been suggested and used as fluid cooling of molds are those that use liquid coolants like water such as those described in U.S. Pat. Nos. 3,887,350 of Jenkins, 4,142,884 of Jones, 4,313,751 of Torok, etc. In these cases, the heat transfer occurs directly through the mold wall and into the fluid.

However, because these water cooling systems are closed circuits, its necessary to use treated water to avoid scaling of the ducts. Then, these systems have been non-practical because its connection is carried out when they are installed on the machine.

Another disadvantage of these systems, is that the water must be maintained at pressure slightly above of the atmospheric pressure. Basically, if the water is maintained to be cold within the mold will be very difficult to heat the mold and also to control the heat transfer. If the water is heated to be compatible with the temperature of glass mold, it will increase the sealing pressure and will produce boiling, scale, water steam, sealing problems and reducing the coefficient of heat transfer.

To overcome the water cooling systems, the U.S. Pat. No. 3,224,860 describes a glass forming mold for dissipating heat which receives from molten glass. Said mold comprising wall means having a first surface portion which is adapted to be placed in heat receiving contact with the molten vitreous material and a heat radiating second surface portion which is exposed to a coolant when the first surface portion is in contact with the molten material. Said surface portions defining at least one sealable internal chamber. A substance preferably as lead, tin, lead or tin alloys, an alkali metal, an alkali metal salt, an alkali metal hydride or an alkali metal hydroxide, which is in liquid state at temperatures about 500° C. is introduced into the internal chamber, so the heat is transferred through this substance to dissipate into the atmosphere.

Also, the U.S. Pat. No. 3,644,110 describes a tool involved in glass making, comprising in combination, wall means enclosing at least one internal chamber and accommodating therein a vaporized volatile heat-exchange medium which is evaporable in the chamber in one region thereof and as a result of the heating of the tool, moves to another cooler region where it becomes condensed, and is returned to the one region by capillary means accommodated in the chamber.

In the above cited patents, the proposed metals and salts are considered to be poor heat conductors in relation with gray iron and aluminum-bronze alloys, and are necessary closed circuits that include a cooling section resulting in a complex system.

Another patents that attempt to improve the heat transfer are those that increase the effective area of the mold to be cooled, for example, the U.S. Pat. No. 3,849,101 of Wythe et al., shows a mold cavity defining structure which has formed an internal chamber. This chamber is filled with a porous filler material which comprises generally spherical metal particles which have been sintered to one another by brazing, or other similar process, to improve heat conduction among themselves. Means are provided for passing a cooling fluid, such as air, to further improve the heat transfer.

The U.S. Pat. Nos. 4,009,017 and 4,082,527 of Jones, shows a system and method for transferring heat through a glass forming mold. In these cases, a forming mold and cooling means for removing heat from the forming mold are included. The cooling means comprising a cooling chamber through which a cooling fluid may be circulated and a fluidizable bed of solid particles within a cavity located between a part of the forming mold and the cooling chamber. Associated with the cooling means is a source of gas, preferably air, under pressure for fluidizing the fluidizable bed of solid particles.

In practice, the design of an adequate mold depends on the type of machine and the selected operation speed.

Taking in account the design criteria and the limitations of the previous art, the inventors of the present invention consider that its necessary to design a mold as a self closed system having a great capacity to support the process variations, a great facility to homogenize its temperature, as well as, a great capacity to withdraw heat from the glass.

The present invention is based on the concepts:
1. That in the heat transfer process analysis involving any phase transformation like for example from solid to liquid and liquid to solid, it is possible to consider the latent heat as an increased heat capacity in the temperature range around the phase transition. Such temperature range going to zero for pure substances and eutectics.
2. That heat capacity plays a role of heat storage, similar to the capacitor effect in the electric circuits or to the tanks in the hydraulic systems.
3. That in Control Theory terms, the capacity effect gives stability to the system in response to the changes produced by the inputs and outputs.

In our invention, this effect will impart thermal stability to the mold, to changes in heat input due to variations timing, glass gob thermal properties, and in heat output due to variations in environment temperatures, cooling air, etc.

Typical examples involving the solidification or melting are of considerable importance in many technical fields: the making of ice, the freezing of foods, or the solidification and melting of metals in casting processes. For example, in the temperature distribution in an ice layer on the surface of a liquid, the upper face is exposed to air at subfreezing temperature. Ice formation occurs progressively at the solid-liquid interface as a result of heat transfer through the ice to the cold air. Heat flows by convection from the water to ice, by conduction through the ice, and by convection to the sink. The ice layer is subcooled except for the interface in contact with the liquid, which is at the freezing point. A portion of the heat transferred to the sink is used to cool the liquid at the interface solid-liquid to the freezing point and to remove its latent heat of solidification. The other portion serves to subcool the ice.

In a wide class of conduction processes in nature and technology, the system becomes divided into two or more regions by the transition isotherms. These phase boundaries traverse the body when the process is not stationary.

Taking in account the concepts described above, the present invention is referred to a new mold and plunger design for the manufacture of glass articles or similar materials, which comprises a first body having an internal cavity configured in accordance with the external profile of the article or the most adequate profile according to the forming process and cycle. A second body in contact with the first body to absorb heat and to control the heat extraction of said first body maintaining a two-phase zone with heat conduction and convection in the liquid zone, heat conduction in a solid zone and a solid-liquid interface motion in agreement with the temperature changes within the mold; and a third body which complements the mold, forming the external part of same to release the heat from said second body.

Within this context, the heat conditions obtained in this new mold will result in a better glass distribution.

Additionally, with the use of the present invention, the mold operation stability is improved, allowing that said mold work at high or low production speeds.

As a consequence of the above, it is possible to obtain articles whose wall thickness is more uniform. This permits a lightweighting of the same. This weight loss has as a consequence a reduction in the consumption of glass, fuels, forming time, etc.

OBJECTIVES OF THE INVENTION

Therefore, the principal objective of the present invention is to provide a molding cooling system for the manufacture of glass articles or similar materials to improve the heat transfer between glass and mold during the glass forming process.

Another objective of the present invention is to provide a molding cooling system for the manufacture of glass articles or similar materials which will improve the temperature distribution in the mold cavity and plunger surface.

An additional objective of the present invention is to provide a molding cooling system for the manufacture of glass articles or similar materials which will improve the thickness distribution of the article.

Other objective of the present invention is to provide a molding cooling system for the manufacture of glass articles or similar materials which permits the increase in production speed of the glass forming machines since it can undertake faster heating-cooling cycles maintaining the mold and plunger temperature within operation limits.

Still another objective of the present invention is to provide a molding cooling system for the manufacture of glass articles or similar materials which operates at high and low production velocities.

These and other objectives and advantages of the present invention will be evident to the experts in the field from the following detailed description of the invention which is provided in order to illustrate the same.

BRIEF DESCRIPTION OF THE DRAWINGS

FIG. 4, is an output of a mathematical modeling experimentally tested, where the temperature distribution within the mold is showed;

FIG. 5, shows a comparison of the behavior of a mold in accordance with the present invention and a conventional one; and, FIG. 6, shows a phase diagram of Al-Mg system use to select materials for the present invention.

DETAILED DESCRIPTION OF THE INVENTION

Figure 1:
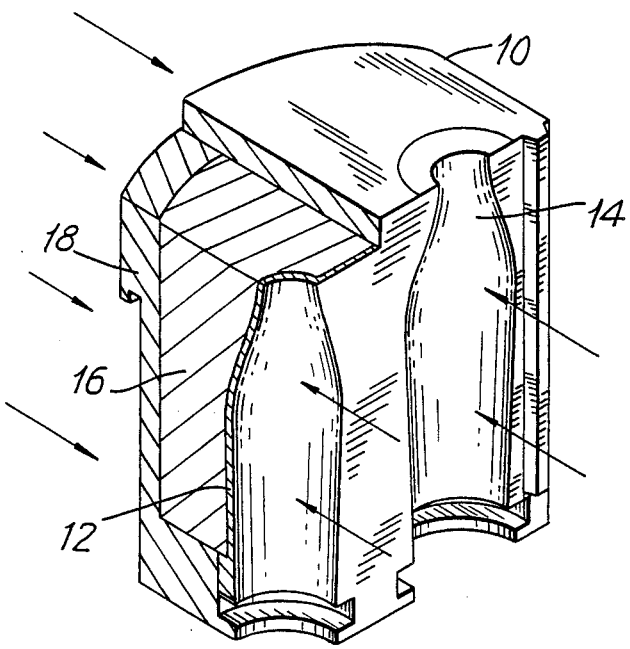
FIG. 1 is a view in a conventional perspective, partially sectioned, and showing one of the halves of a mold of the present invention.
Figure 3:
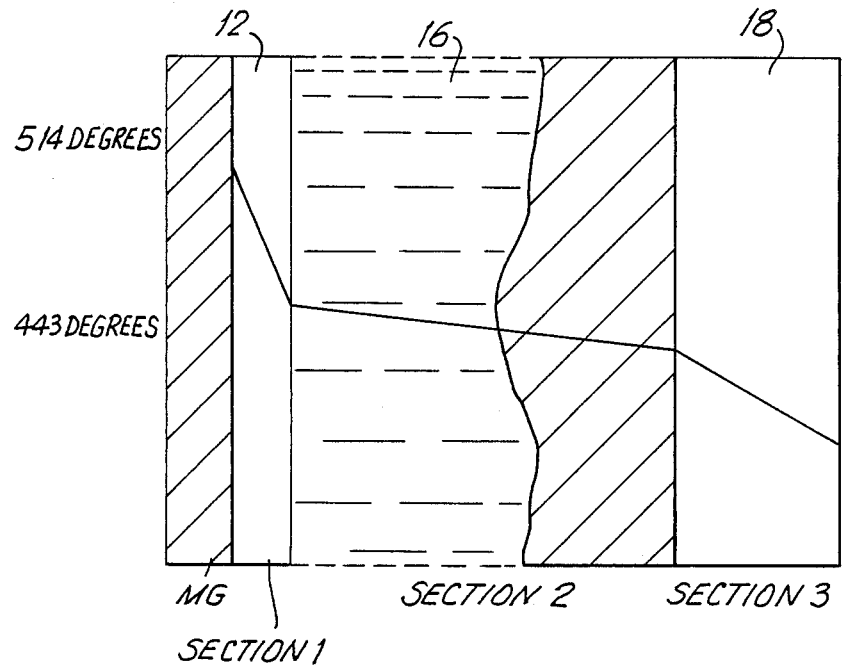
FIG. 3 shows a schematic representation of the mold of the present invention when it is operating.

Now making particular reference to FIGS. 1 and 3, a mold is showed as per the present invention made up of two halves, one of which is illustrated with the number 10. This mold is used for the formation of glass articles. The mold comprising: a first body 12, having an internal cavity 14 configured in accordance with the external profile of the article or the most adequate profile according to the forming process and cycle. Said profile can have the form of the preform (parison) or the final form of the article. This first body 12 can be manufactured by a material selected from group of: Iron-base Alloys, Copper-base Alloys or Nickel-base Alloys.

A second body 16, in contact with the first body 12 to absorb heat and to control the heat extraction of said first body 12. The second body 16, will absorb heat and will control the heat extraction of said first body 12 by the following principles: heat conduction and convection in a liquid zone; heat conduction in a solid zone; and, by means of a solid-liquid interface motion in agreement with the temperature of operation of the mold.

In operation, the internal cavity of the first body 12 increase its temperature (i.e. 514° C.), and the material of the body 16, in contact with the first body 12 will absorb heat and its temperature will increase until its melting point temperature (FIG. 4). While the second body absorbs heat, the first body will tend to diminish its temperature peaks.

During operation, the second body 16 must be partially liquefied, with a liquid zone in contact with the first body 12 and a solid zone in contact with the third body 18 (as will be described later). This two-phase state will be maintained by a dynamic equilibrium between the thermal load provided by the glass to the first body 12 and the cooling applied to the third body 18. Said third body 18 having a temperature below the melting point of the material selected to produce the thermal gradient for an efficient heat extraction and to maintain the second body 16 in a two-phase state during the forming cycle.

The thermal load variations will affect the amount of liquid and solid zone of the second body 16. If the heat increases it will warm a solid layer material in the liquid-solid interface, and will provide the necessary latent heat to melt that solid material, increasing the liquid zone.

When the heat is released to the atmosphere by the third body 18 the heat loosed will be in part, the latent heat of solidification, displacing the solid zone and returning the liquid-solid interface to a new equilibrium position in the body 16. This interface motion will depend upon the operation conditions in the glass forming machines.

The second body 16 having preferably a high thermal conductivity, high heat capacity in the solid-liquid state, high latent heat of fusion, and a melting point temperature above of 377 and below 548 centigrade degrees. Depending of the application conditions, i.e. if the thermal conditions are light (low speed, small articles, etc.) could be selected a material with low melting point temperature like an eutectic alloy, as the alloys Nos. 12 and 14 showed in Table 1. If the thermal load is high (high speed, heavy articles, etc.) a suitable higher melting point material can be chosen, i.e. the alloys Nos. 6, 7, 8, 11, 13 and 15 (Table 1).

In any case a medium range materials will be suitable for common applications.

Figure 6:
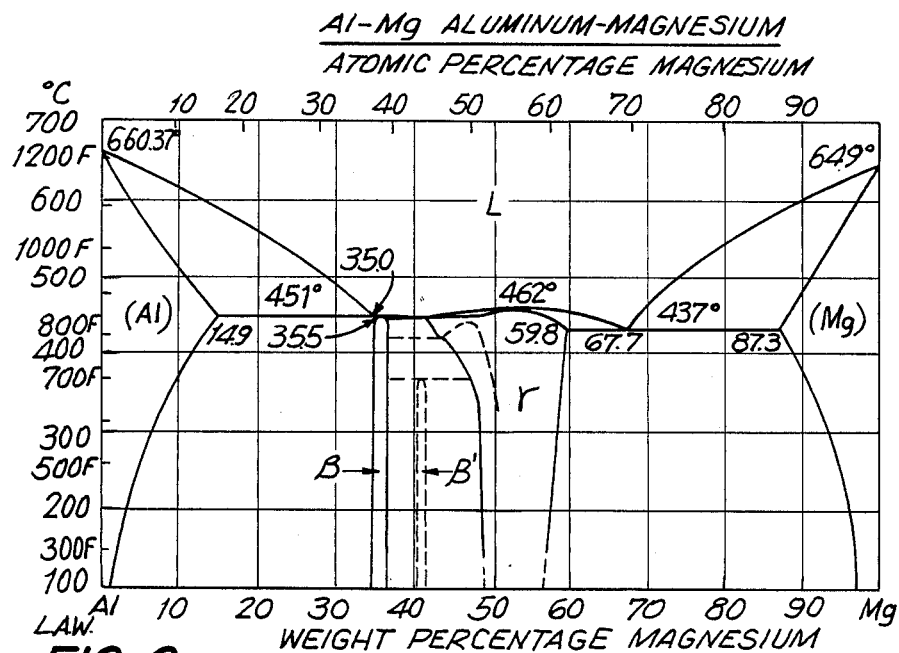

The materials which preferably can be utilized as a second body 16 including, a pure metal, eutectic alloys, or a material with a fusion temperature of short range to maintain a small and uniform temperature during the melting stage. Said second body can be made of zinc (420° C.); eutectic alloys constituted of 65% Aluminum-35% Magnesium (450° C.); 68% Magnesium-32% Aluminum (438° C.); or any alloy of a short range melting point of said system, as can be see in the phase diagram of the FIG. 6.

The alloys that can be used are the following:

TABLE 1

|    | Al | Mg | Zn | Cu | Ca | Si | Ni | Sb | In | Pb | M.P.T. |
|----|----|----|----|----|----|----|----|----|----|----|--------|
| 1. | 68 | 32 |    |    |    |    |    |    |    |    | 438° C. |
| 2. | 65 | 35 |    |    |    |    |    |    |    |    | 450° C. |
| 3. | 59 | 35 | 6  |    |    |    |    |    |    |    | 443° C. |
| 4. |    | 60 | 15 | 25 |    |    |    |    |    |    | 452° C. |
| 5. |    | 52 |    | 25 | 23 |    |    |    |    |    | 453° C. |
| 6. | 54 | 18 | 6  | 22 |    |    |    |    |    |    | 520° C. |
| 7. | 68 |    |    | 27 |    | 5  |    |    |    |    | 524° C. |
| 8. | 66 |    |    | 33 |    |    |    |    |    |    | 548° C. |
| 9. | 61 | 6  |    | 33 |    |    |    |    |    |    | 508° C. |
| 10.| 65 | 32 |    | 3  |    |    |    |    |    |    | 450° C. |
| 11.| 65 | 10 |    | 25 |    |    |    |    |    |    | 518° C. |
| 12.| 7  |    | 89 | 4  |    |    |    |    |    |    | 377° C. |
| 13.| 27 |    |    |    | 73 |    |    |    |    |    | 545° C. |
| 14.| 5  |    | 95 |    |    |    |    |    |    |    | 382° C. |
| 15.|    | 84 |    |    |    | 16 |    |    |    |    | 517° C. |
| 16.|    | 18 |    |    |    | 82 |    |    |    |    | 456° C. |
| 17.|    | 31 |    | 69 |    |    |    |    |    |    | 485° C. |
| 18.| 76 |    |    |    |    |    | 24 |    |    |    | 507° C. |
| 19.|    |    |    |    |    |    |    | 69 | 31 |    | 494° C. |
| 20.| 33 |    |    |    |    |    |    |    |    | 67 | 466° C. | wherein M.P.T. represents the melting point temperature of each alloy.

And, a third body 18, which complements the mold in order to release the heat. Said third body 18, can be provided with a series of circumferential or axial grooves, holes, metal inserts or pipes for fluid cooling (not shown) in order to dissipate the heat. This third body 18 can be manufactured of a material such as Iron-base Alloys, Copper-base Alloys or Nickel-base Alloys.

Making now reference to FIG. 4, an example through mathematical modeling simulation, assuming the actual plant parameters to show the behavior of the mold when it is in operation. As can be seen in said FIG. 4, the section 1 represents the surface or cavity of mold 14, of the first body 12. This particular example shows the time when the surface of the mold is in contact with the glass gob and reach the maximum temperature (514° C.). Section 1 transfers heat by conduction, and its temperature gradient depends of the material thermal properties of the first body 12. The material of section 2 in contact with the internal surface of the section 1, absorbs the heat transmitted passing gradually from a solid state to a liquid state, as it reaches its melting point temperature to control the operation temperature of the mold. While the second body absorbs heat, the temperature in the first body 12 will tend to be more stable. The second body 16, will melt by layers when they reach their melting point temperature and additionally absorbs the latent heat of fusion.

The section 2 (body 16) acts as a temperature regulator, keeping a two-phase material with a solid-liquid interface which absorbs the heat load variations in said mold. That is, when the heat load increases, the material of body 16 will melt in a layer necessary to absorb the excess of heat. When the heat load decreases or by the cooling action, a liquid layer will diminish its temperature below the melting point and it solidifies, loosening its heat of fusion. This liquid-solid motion will continue until an equilibrium point within the second body is reached, showed as a doted line in FIG. 4. Section 3 represents the body 18, which serves to release the heat from the second body 16. The section 3, is cooled with the fluid supplied from an appropriate cooling system (not shown).

The FIG. 5 shows a simulation of the behavior of a mold in accordance with the present invention, using the properties of the eutectic alloy No. 3 (table 1), and a conventional mold, showing that, when the molten glass is formed with a mold manufactured in accordance with the present invention, the cavity and internal temperature of the mold is diminished.

Figure 2:
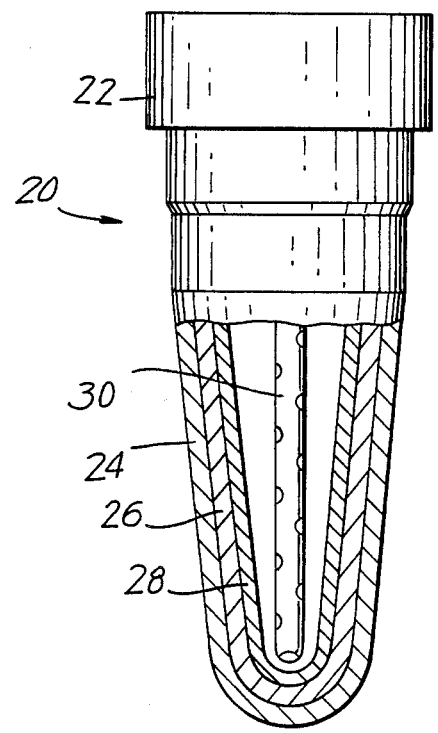
FIG. 2 is a view in a conventional perspective, of a plunger manufactured in accordance with the present invention.

Making now reference to FIG. 2, a plunger 20 for the manufacture of glass articles in accordance with the present invention is described. A ring assembly 22 to support the upper end of the plunger 20. Basically, the plunger 20 is manufactured in accordance with the present invention comprising: a first body 24, having an external surface configured in accordance with the internal profile of the article.

A second body 26, in contact with the first body 24 to absorb heat and to control the heat extraction of said first body 24. The second body 26 as was described in the first embodiment of the present invention, will absorb heat and will control the heat extraction of said first body 24. And, a third body 28, which complements the plunger in order to release the heat. Said third body 28, comprising: means for continuously provide a coolant flow through a tube 30, so that the coolant enters through the tube 30 to release the heat from the third body 28.

Finally, it must be understood that the invention is not limited to the manufacture of molds in agreement with the form described above and that it is possible to construct the first and third bodies as a single body and of a single material with an internal cavity to receive the second body. Likewise, the manufacture of the molds for the manufacture of glass articles, is not limited to the materials already mentioned and these can be manufactured with any other type of material or composition which could tend to make uniform the temperature of the mold cavity.

Therefore, even though certain embodiments of the present invention have been shown and described, it must be understood that many modifications of the same are possible. Therefore, the present invention must not be considered as restricted except by that which is required by the technology of the field and the spirit of the attached claims.

We claim:

1. A glassware forming mold for controlling the heat transference in a glassware forming process, comprising a three-layer construction including first and third bodies, one of which is in contact with a portion of molten glass fed thereto to form a glassware article; and a second central body between said first and third bodies, comprised of a metallic alloy which melts approximately at a temperature between about 375° C. and 550° C. corresponding approximately to a working temperature of the molten glass, providing a solid-liquid state, to control the heat transference from the molten glass to the first or third bodies and from these to the environment during the glass forming process, whereby the glass distribution within the mold is improved;

wherein the material of the second body is selected from alloys of the group consisting of eutectic zinc-base Alloys, Aluminum-base Alloys, Magnesium-base Alloys or mixtures of Ca-Al, Sb-In, Al-Pb, Cu-Mg to promote the liquid-solid phase by reason of their different melting points.

2. The mold as claimed in claim 1 wherein the temperature at which the alloy provides a solid-liquid state is from about 548° C. to about 438° C.

3. The mold as claimed in claim 1 wherein the temperature at which the alloy provides a solid-liquid state is from about 517° C. to about 542° C.

4. The mold as claimed in claim 1 wherein the temperature at which the alloy provides a solid-liquid state is from about 382° C. to about 377° C.

5. The mold as claimed in claim 1 wherein the temperature at which the alloy provides a solid-liquid state is from about 545° C. to about 456° C.

6. The mold as claimed in claim 1 wherein the temperature at which the alloy provides a solid-liquid state is about 485° C.

7. The mold as claimed in claim 1 wherein the temperature at which the alloy provides a solid-liquid state is about 494° C.

8. The mold as claimed in claim 1 wherein the temperature at which the alloy provides a solid-liquid state is about 466° C.

* * * * *